United States Patent [19]
Howe

[11] Patent Number: 5,913,969
[45] Date of Patent: Jun. 22, 1999

[54] WATER BASED PAINT PROTECTANT

[75] Inventor: Michael W. Howe, Mission Viejo, Calif.

[73] Assignee: Armor All Products Corp., Aliso Viejo, Calif.

[21] Appl. No.: 08/748,423

[22] Filed: Nov. 13, 1996

Related U.S. Application Data

[63] Continuation of application No. 08/275,905, Jul. 15, 1994, abandoned.

[51] Int. Cl.$^6$ .............................. C09G 1/16; C09G 1/18
[52] U.S. Cl. .................................. 106/2; 106/3; 106/11; 106/287.11; 106/287.13; 106/287.14; 510/256; 510/400
[58] Field of Search .............. 106/2, 3, 11, 287.11, 106/287.13, 287.14; 510/256, 400

[56] References Cited

U.S. PATENT DOCUMENTS

| | | | |
|---|---|---|---|
| H1003 | 12/1991 | Ishiwata et al. | 430/502 |
| 3,562,786 | 2/1971 | Bailey et al. | 252/174.15 |
| 4,013,475 | 3/1977 | Liebowitz et al. | 106/10 |
| 4,689,168 | 8/1987 | Requejo | 510/417 |
| 4,784,799 | 11/1988 | Petroff | 252/174.15 |
| 4,936,914 | 6/1990 | Hurley et al. | 106/3 |
| 4,997,478 | 3/1991 | Gordon | 106/3 |
| 5,017,221 | 5/1991 | Legrow et al. | 106/3 |
| 5,093,031 | 3/1992 | Login et al. | 252/357 |
| 5,104,647 | 4/1992 | Policello | 71/64.1 |
| 5,112,394 | 5/1992 | Mller | 106/3 |
| 5,226,954 | 7/1993 | Suzuki | 106/2 |
| 5,275,645 | 1/1994 | Ternoir et al. | 106/2 |
| 5,296,336 | 3/1994 | Doi et al. | 106/2 |
| 5,326,387 | 7/1994 | Faber et al. | 106/3 |
| 5,421,865 | 6/1995 | Grulke et al. | 106/2 |
| 5,425,899 | 6/1995 | Nguyen et al. | 252/321 |
| 5,503,778 | 4/1996 | Liu et al. | 252/542 |
| 5,508,249 | 4/1996 | Narayanan et al. | 504/116 |
| 5,558,806 | 9/1996 | Policello et al. | 252/355 |
| 5,573,710 | 11/1996 | McDonell | 510/405 |

FOREIGN PATENT DOCUMENTS

| | | |
|---|---|---|
| 0 068 771 | 1/1983 | European Pat. Off. . |
| 0 239 084 | 9/1987 | European Pat. Off. . |
| 1-163280 | 6/1989 | Japan ......................... 106/3 |
| 2 130 591 | 6/1984 | United Kingdom . |

OTHER PUBLICATIONS

Derwent Abstract 18951A/10 of JP 1–163280, (Jun. 1989).
Chem. Abs. v. 125, No. 198728 of "Antifogging coating compositions . . . ", JP 08176466 A2, Sep. 1996.

*Primary Examiner*—Mark L. Bell
*Assistant Examiner*—Scott L. Hertzog
*Attorney, Agent, or Firm*—Flehr Hohbach Test Albritton & Herbert LLP; David J. Brezner; Robin M. Silva

[57] ABSTRACT

A protective composition for automotive painted surfaces is provided, comprising emulsified silicone, an evaporation modifier and an agent which increases wetting speed, dispersed in water.

20 Claims, No Drawings

WATER BASED PAINT PROTECTANT

This is a continuation of application Ser. No. 08/275,905 filed Jul. 15, 1994 abandoned.

FIELD OF THE INVENTION

This invention relates to a protective composition suitable for use on painted surfaces, and in particular on cars.

BACKGROUND OF THE INVENTION

Many different types of automotive protectants are known in the art. For example, many different paste and liquid waxes are known. These products are applied to a clean surface and are rubbed or buffed to give a protective finish to the car. Such products generally require a minimum of 45 to 90 minutes for one person to apply, depending on the size of the car, and the application of a physical "buffing" force.

To overcome these disadvantages, several silicone-based treatments are on the market, such as "ZOIEG", "WATERLESS CAR WASH" AND "NU FINISH". These products are organic solvent-based solutions of various silicones. These products relied upon high levels of solvents and abrasives to provide uniform film levels of silicone. These products generally do not show enhancement of color or gloss, and do not provide significant durability.

Thus it is an object of the invention to provide an easy to apply, water-based protectant which enhances color, gloss and durability of an automotive painted surface.

SUMMARY OF THE INVENTION

The invention provides an aqueous protective composition comprising emulsified silicone, an evaporation modifier, and an agent that increases the wetting speed, dispersed in water.

In one aspect, the emulsified silicone comprises dimethyl silicone fluid, amino-functional silicone fluid, and silicone resin, emulsified in water.

The invention also provides methods for protecting an automotive painted surface. The method comprises applying an aqueous protective composition to the automotive painted surface and wiping the surface to spread and dry the protectant.

DETAILED DESCRIPTION OF THE INVENTION

Typically, the desirable properties of a automotive protective composition are the enhancement of color, gloss and durability, as well as ease of application.

The present invention provides such an aqueous protective composition comprising emulsified silicone, an evaporation modifier, and an agent that increases the wetting speed, dispersed in water.

By "emulsified silicone" herein is meant an emulsion of one or more derivatized or underivatized silicone compounds such as dimethyl-containing silicone fluids, amino-functional silicone fluids, and silicone resins. Preferably the emulsified silicone is a mixture of dimethyl silicone fluid, amino-functional silicone fluid, and silicone resin. The dimethyl silicone fluid contributes the gloss and slip of the finish, i.e. the silky feel of the protectant. The amino-functional silicone fluid deposits on or reacts with the painted surface, such that the silicone layer is firmly retained on the surface (e.g. by covalent or non-covalent bonding) and will not wash off easily. This contributes to the durability of the protectant. The silicone resin acts as a solidifier, to give the silicone layer more body, less mobility (i.e. such that it will not wipe off), and greater durability.

In the preferred embodiment, the range of acceptable molecular weights for the silicones is from about 500 to about 30,000. Generally, the higher the molecular weight of the silicone, the more wax-like properties are imparted, such as higher gloss, color enhancement, water-beading and durability. However, when the molecular weight is too high, the silicone becomes similar to conventional waxes with their attendant problems, such as difficulty of application.

In addition, amino-functional silicones vary in the number of derivatized amine groups. In the preferred embodiment, mid-level base equivalent amino-functional silicones are used.

Preferably, the emulsified silicone is dispersed in water, although some embodiments utilize other aqueous carriers.

The emulsified silicone ranges from about 15% to about 75% solids, with about 50% solids being preferred. Accordingly, the dimethyl silicone can range from about 0% to about 100% of the solids in the emulsion, with about 20% to about 95% being preferred, and 89% being the most preferred. That is, in an emulsion that is 50% solids, dimethyl silicone provides 44.5% solids. The amino-functional silicone comprises from about 0% to about 100% of the solids in the emulsion, with about 1% to 10% being preferred, and 7% being the most preferred. That is, in an emulsion that is 50% solids, amino-functional silicone provides 3.5% solids. The silicone resin ranges from about 0% to about 20% of the solids in the emulsion, with about 0.05% to 10% being preferred, and 4.0% being the most preferred. That is, in an emulsion that is 50% solids, silicone resin provides 2% solids.

The silicone emulsion also contains a sufficient amount of one or more emulsifiers to maintain the silicone in emulsified form. Suitable emulsifiers include octyl phenol ethoxylate. It is desirable for the emulsion to have a proper hydrophilic-lipophilic balance (HLB). The desired HLB ranges from about 12.5 to about 14.5, with a preferred HLB of 13.4. This HLB is achiedved using an octylphenol ethoxylate with an HLB of 8 and another one with an HLB of 18, with the percentage in the formula being 2.5 and 3, respectively. In one embodiment, the emulsifier in the emulsified silicone is of sufficient amount to allow the entire protective composition to be an emulsion; i.e. once formulated in the composition, the silicone is still emulsified. In alternative embodiments, the emulsifier does not cause the silicone in the protective composition to remain emulsified, and thus the silicone may settle out over time. In this embodiment, the composition is shaken or stirred to evenly disperse the silicone solids within the composition prior to application.

The silicone emulsion ranges from about 2% to about 6% by weight in the protective composition, with about 2% to about 4% being preferred, and about 3.0% being the most preferred.

By "evaporation modifier" herein is meant a compound which modifies the rate of evaporation of the aqueous phase of the protective composition. If the rate of evaporation is too rapid, the composition will harden as it is applied, without allowing time for wiping and spreading. This results in the silicone layer being uneven and irregular. Similarly, the rate of evaporation cannot be too slow, since this allows drips to form, and dust and other debris to lodge in the silicone layer, detracting from the gloss and shine and leaving a smeary surface which may streak. Generally, the evaporation modifier must allow the applied composition to remain liquid and spreadable for at least about 1 minute, yet dry within about 3 minutes. In the absence of an evaporation modifier, the composition typically dries in about 15 seconds, depending on the environmental temperature and the temperature of the surface.

In some embodiments, the evaporation modifier will increase the evaporation rate. In other embodiments, the evaporation modifier will retard the evaporation rate. For example, if the dynamic surface tension reducer used in the composition increases the rate of evaporation of the composition, an evaporation modifier which retards the rate of evaporation will be used.

In addition, the evaporation modifier must not significantly alter the solubility of the silicone in the composition. If the solubility of the silicone is significantly increased, the silicone layer will wipe off, causing irregularities in the silicone layer and a loss of protection. Similarly, the solubility of the silicone should not be decreased by the evaporation modifier, since this also results in a loss of protection.

In one embodiment, the evaporation modifier is a glycol ether. In a preferred embodiment, the evaporation modifier is either propylene glycol phenyl ether or ethylene glycol phenyl ether. Propylene glycol phenyl ether is particularly preferred, since it results in high gloss and depth of color of the painted surface.

The evaporation modifier ranges from about 0.5% to about 3.5% by weight in the protective composition, with about 1% to about 3% being preferred, and about 2.0% being the most preferred.

By "an agent that increases the wetting speed" herein is meant a compound which increases the rate at which a low surface tension is achieved, in comparison to the compound without such reducer. A low surface tension of the protective composition is necessary to wet the surface and promote spreadability, thus avoiding the formation of beads or drops on the surface. While silicone compounds generally do have low surface tension, they are very slow to spread due to their high viscosity. Accordingly, an agent that increases the wetting speed is necessary to increase the spreading of the composition on the surface. Generally, in the absence of an agent that increases the wetting speed, the spray application of the protective composition results in droplets or beads being deposited on the surface. Accordingly, the addition of the agent that increases the wetting speed causes the spray application of the composition to be a continuous and uniform sheet on the surface. However, the amount of the agent that increases the wetting speed should be adjusted such that the composition does not significantly run or drip prior to wiping.

Similar to the evaporation modifier, the surface tension reducer will not significantly alter the solubility of the silicone.

In a preferred embodiment, the agent that increases the wetting speed comprises n-octyl pyrrolidone. Other agents that increase the wetting speed include sarcosinates and dimethyl hexynol type materials.

The agent that increases the wetting speed ranges from about 0.05% to about 0.5% by weight in the protective composition, with about 0.05% to about 0.3% being preferred, and 0.10% being the most preferred.

The amount of water in the protective composition ranges from about 90% to about 98% by weight, with about 90% to about 96% being preferred, and 94.90% being the most preferred.

Preferably, the protective composition of the present invention is essentially free of abrasives, such as silicas, silicates, kaopolite or celite, normally found in silicone-based protectant products, as well as volatile organic compounds or solvents.

Also the foregoing protectants may be loaded into aerosol or pump spray dispensers known in the art. In some embodiments, additional ingredients are added to the composition to facilitate aerosol application, also as is well known in the art.

The composition may be applied to any automotive painted surface. The surface may be clean, dirty, new or moderately oxidized. The surface may be cool or hot.

The protective composition of the present invention may be applied in a variety of ways. In a preferred embodiment, the composition is applied by aerosolization or pump spraying. However, the composition may be applied as a liquid as well. Generally, the composition is applied to portions of the surface at a time, to prevent the composition from drying before wiping.

As soon as the composition is applied, the surface is preferably wiped, preferably using a clean dry cloth, to spread the composition as uniformly as possible. The surface is then rewiped lightly to dry, again preferably using a clean, dry cloth.

When applied in this manner, the protective composition protects and beautifies the painted surfaces of a car without smearing or streaking. It provides a high gloss on the surface, and enhances the color of the surface. It provides a durable, water beading surface. Durability is measured by the water-beading capabilities of the surface over time. A loss of shine may also indicate a loss of protectant.

The following examples serve to more fully describe the manner of using the above-described invention, as well as to set forth the best modes contemplated for carrying out various aspects of the invention. It is understood that these examples in no way serve to limit the true scope of this invention, but rather are presented for illustrative purposes.

EXAMPLE 1

Preparation of a Protective Composition

A typical formulation of a protective composition is as follows:

| Ingredient | Amount (% by wt.) |
|---|---|
| propylene glycol phenyl ether | 2.00 |
| n-octyl pyrrolidone | 0.10 |
| Emulsified silicone: | 3.00 total |
| a) dimethyl silicone | 2.67 |
| b) amino-functional silicone | 0.21 |
| c) silicone resin | 0.12 |
| water | 94.90 |

The propylene glycol phenyl ether was obtained from DOW. The n-octyl pyrrolidone was obtained from ISP. The dimethyl silicone was "WS101", obtained from Wocker, Inc. The amino-functional silicone was "F784" or "F785", obtained from Wocker, Inc. The silicone resin was "VP1038", obtained from Wocker, Inc.

The composition was made as follows. First the emulsified silicone was made. This was done by blending the silicones, resins and surfactants together. The water was slowly added with non-shear aggitation, with mixing after all the water was added. Typical emulsions had a particle size of $150\mu$ to $350\mu$, and preferably were in the 230 to $300\mu$ size.

The composition was applied via either pump spraying or aerosolization to a variety of automotive painted surfaces under various conditions, including clean, dirty and moderately oxidized surfaces. In addition, the composition was applied both in full sunlight as well as in shade.

After application, a clean, dry cloth was used to spread the composition evenly. Then the surface was rewiped gently to dry the composition.

The treatment resulted in high gloss and color enhancement, with actual durability exceeding 4 weeks.

I claim:

1. An aqueous protective composition comprising emulsified silicone, an evaporation modifier, and an agent that increases the wetting speed, dispersed in water, wherein said emulsified silicone comprises from about 2% to 6% by weight, wherein said agent that increases the wetting speed comprises from about 0.05% to about 0.3% by weight, and wherein said water comprises from about 90% to about 98% by weight.

2. An aqueous protective composition comprising emulsified silicone, an evaporation modifier, and an agent that increases the wetting speed, dispersed in water, wherein said emulsified silicone comprises dimethyl silicone fluid, amino-functional silicone fluid, and silicone resin wherein said water comprises from about 90% to about 98% by weight.

3. A method of protecting an automotive painted surface comprising a) applying to said surface an aqueous protective composition comprising water, a silicone emulsion, an evaporation modifier, and an agent that increases the wetting speed, wherein said emulsified silicone comprises dimethyl silicone fluid, amino-functional silicone fluid, and silicone resin wherein said water comprises from about 90% to about 98% by weight; and b) wiping said surface to spread said composition.

4. An aqueous protective composition comprising emulsified silicone, an evaporation modifier, and an agent that increases the wetting speed, dispersed in water, wherein said emulsified silicone comprises from about 2% to about 6% by weight, wherein said evaporation modifier comprises from about 0.5% to about 3.5% by weight, and wherein said agent that increases the wetting speed comprises from about 0.05% to about 0.5% by weight wherein said water comprises from about 90% to about 98% by weight.

5. The composition of claim 1 wherein said emulsified silicone comprises dimethyl silicone fluid, amino-functional silicone fluid, and silicone resin, emulsified in water.

6. The composition of claim 1, 2, or 4 wherein said evaporation modifier is a glycol ether.

7. The composition of claim 6 wherein said glycol ether is propylene glycol phenyl ether.

8. The composition of claim 1, 2, or 4 wherein said agent that increases the wetting speed is n-octyl pyrrolidone.

9. The composition of claim 1 wherein said evaporation modifier comprises from about 0.5% to about 3.5% by weight.

10. The composition of claim 2 wherein said agent that increases the wetting speed comprises from about 0.05% to about 0.5% by weight.

11. The composition of claim 1 wherein said emulsified silicone comprises from about 2% to about 4% by weight.

12. A composition according to claim 4 wherein said emulsified silicone comprises dimethyl silicone fluid, amino-functional silicone fluid, and silicone resin.

13. The composition of claim 1 which is substantially free of abrasives.

14. The composition of claim 1, 2, or 4 formulated into an aerosol spray.

15. A pump spray dispenser containing the composition of claim 1, 2, or 4.

16. A method of protecting an automotive painted surface comprising a) applying to said surface an aqueous protective composition according to claim 1, 2, or 4; and b) wiping said surface to spread said composition.

17. The method of claim 16 wherein said application is performed by aerosolization.

18. The method of claim 17 wherein said aerosolization is performed by pump spraying.

19. The method of claim 16 wherein said method further comprises c) rewiping said surface to dry said protectant.

20. The composition of claim 5, 2, or 12 wherein said emulsified silicone contains roughly 50% solids, and said dimethyl silicone fluid comprises from about 10% to about 95% of the solids, said amino-functional silicone fluid comprises from about 1% to about 10% of the solids, and said silicone resin comprises from about 0.05% to about 10% solids.

* * * * *